US012679494B2

(12) United States Patent
Pfaeffle et al.

(10) Patent No.: US 12,679,494 B2
(45) Date of Patent: Jul. 14, 2026

(54) BICYCLE-ASSEMBLY

(71) Applicant: KTM AG, Mattighofen (AT)

(72) Inventors: Luca Pfaeffle, Mattsee (AT); Emrich Pasching, Maria Schmolln (AT)

(73) Assignee: KTM AG, Mattighofen (AT)

( * ) Notice: Subject to any disclaimer, the term of this patent is extended or adjusted under 35 U.S.C. 154(b) by 361 days.

(21) Appl. No.: 18/421,248

(22) Filed: Jan. 24, 2024

(65) Prior Publication Data

US 2024/0253725 A1      Aug. 1, 2024

(30) Foreign Application Priority Data

Jan. 26, 2023    (AT) ............................... A 50041/2023

(51) Int. Cl.
B62K 3/02 (2006.01)

(52) U.S. Cl.
CPC ............ B62K 3/02 (2013.01); *B62K 2201/04* (2013.01)

(58) Field of Classification Search
CPC ............................... B62K 3/02; B62K 2201/04
USPC ........................................................ 280/283
See application file for complete search history.

(56) References Cited

U.S. PATENT DOCUMENTS

| 1,272,399 A * | 7/1918 | Douglas ............... B62K 25/286 |
| | | 280/284 |
| 8,006,993 B1 * | 8/2011 | Chamberlain ......... B62K 25/22 |
| | | 280/281.1 |
| 8,459,680 B2 | 6/2013 | Chamberlain |
| 8,622,411 B1 | 1/2014 | Chamberlain |
| 8,801,023 B2 | 8/2014 | Chamberlain |
| 9,056,647 B2 * | 6/2015 | Hu ......................... B62K 25/04 |
| 9,334,011 B2 * | 5/2016 | Chamberlain .......... B62K 3/02 |
| 9,598,140 B2 * | 3/2017 | Berthold ............. B62K 25/286 |
| 9,988,122 B2 * | 6/2018 | Pedretti .................. B62K 13/08 |
| 10,814,932 B2 * | 10/2020 | Yi ............................. B62K 3/02 |
| 10,926,830 B2 * | 2/2021 | Zawistowski .......... B62K 19/42 |
| 12,441,421 B2 * | 10/2025 | Hoffmann .................. B62J 1/08 |
| 2010/0327553 A1 * | 12/2010 | Talavasek ................ B62K 3/02 |
| | | 188/299.1 |
| 2012/0074666 A1 | 3/2012 | Chamberlain |

(Continued)

FOREIGN PATENT DOCUMENTS

| DE | 600 21 970 | 3/2006 | |
| DE | 202006006777 U1 * | 8/2006 | ........... B62K 25/286 |

(Continued)

*Primary Examiner* — James A Shriver, II

(74) *Attorney, Agent, or Firm* — Wenderoth, Lind & Ponack, L.L.P.

(57) ABSTRACT

A bicycle assembly includes a shock absorber with a first end and a second end, a link bracket with a first hinge connection for pivotably connecting to the first end of the shock absorber, and a second hinge connection for pivotably connecting to a bicycle frame. A first pivot axis runs through the first hinge connection, and a second pivot axis runs through the second hinge connection. In the installed state of the link bracket on the shock absorber, the second hinge connection and the second pivot axis are arranged between the first end and the second end of the shock absorber relative to the longitudinal axis of the shock absorber. The first pivot axis and the second pivot axis are spaced apart from each other by a positive normal distance and run transversely to each other.

15 Claims, 8 Drawing Sheets

(56)  References Cited

U.S. PATENT DOCUMENTS

| 2013/0214507 | A1* | 8/2013 | O'Connor | B62K 19/00 |
| | | | | 280/284 |
| 2013/0341886 | A1* | 12/2013 | Chamberlain | B62K 19/30 |
| | | | | 280/284 |
| 2014/0103617 | A1 | 4/2014 | Chamberlain | |
| 2015/0028561 | A1* | 1/2015 | Chamberlain | B62K 25/20 |
| | | | | 280/284 |
| 2019/0039682 | A1 | 2/2019 | Zawistowski | |
| 2019/0308688 | A1* | 10/2019 | Chamberlain | B62K 25/28 |
| 2021/0078669 | A1* | 3/2021 | Chamberlain | B62K 3/04 |
| 2023/0219650 | A1 | 7/2023 | Zawistowski | |
| 2024/0253725 | A1* | 8/2024 | Pfaeffle | B62K 3/02 |
| 2024/0286705 | A1* | 8/2024 | O'Connor | B62K 25/286 |
| 2024/0317354 | A1* | 9/2024 | Canfield | B62K 25/286 |

FOREIGN PATENT DOCUMENTS

| DE | 20 2018 102 698 | | 7/2018 | | |
| DE | 10 2020 106 510 | | 4/2021 | | |
| EP | 1 982 911 | | 11/2011 | | |
| EP | 4406820 | A1* | 7/2024 | | B62K 25/286 |
| TW | 1786990 | | 12/2022 | | |
| WO | 2019/010394 | | 1/2019 | | |
| WO | WO-2025012504 | A1* | 1/2025 | | B62K 19/30 |

* cited by examiner

BICYCLE-ASSEMBLY

This application claims priority to Austrian Patent Application A 50041/2023, filed Jan. 26, 2023. Thus, all of the subject matter of Austrian Patent Application A 50041/20203 is incorporated herein by reference.

BACKGROUND OF THE INVENTION

The present invention relates to a bicycle assembly as well as a bicycle frame with such a bicycle assembly.

Bicycle frames with a sprung rear triangle are known in general in the state of the art. Usually, an axle of a rear wheel is clamped in the rear triangle of the bicycle frame and is movable, guided within a spring travel, relative to a main frame of the bicycle frame. A cushioning and damping of the movement is usually carried out by a linearly length-adjustable shock absorber.

In principle, connections with bearing pins are known for connecting shock absorbers to a rear triangle. A shock absorber can be connectable directly to the rear triangle with a bearing pin.

In the state of the art, link brackets with which a connection to a bicycle frame can be created are also known for the linkage of shock absorbers. In particular, the shock absorber can be connectable to the rear triangle of the bicycle frame with a link bracket. In the state of the art, known link brackets can serve in general for connection between the shock absorber and the rear triangle and/or the bicycle frame. The link bracket can serve to extend the shock absorber or to extend the connection between the shock absorber and the rear triangle and/or the bicycle frame, for example in order to connect the shock absorber to the rear triangle by means of a stay of the bicycle frame—for example a seat tube.

If the shock absorber is connected to the rear triangle and/or the bicycle frame via only one bearing pin, the geometry of the rear triangle must be adapted to the shock absorber and the position of the shock absorber in the bicycle frame. If the shock absorber is connected to the rear triangle and/or the bicycle frame via a link bracket, which serves to extend the shock absorber or to connect it to the rear triangle and/or the bicycle frame, undesirably elevated forces, in particular forces directed laterally to the linear movability of the shock absorber, can occur. Additional guide means for guiding the movement of such a link bracket may also be necessary, such as for example linear guides or additional levers. The geometry and kinematics of a sprung bicycle frame of link brackets known in the state of the art is determined by the dimensions, in particular the longitudinal extent, of the shock absorber.

WO2019010394A1 of Yeti Cycling, Llc shows an extension of a linkage of a suspension strut with two arms movable relative to each other.

US 2012 074666 A1 of Specialized Bicycle Components Inc shows an extension for a linkage of a suspension strut.

SUMMARY OF THE INVENTION

The object of the invention is to specify a bicycle assembly, improved compared with the state of the art, comprising a shock absorber and a link bracket, in which the disadvantages mentioned at the outset do not occur.

The bicycle assembly in principle comprises a shock absorber and a link bracket.

The shock absorber has a longitudinal axis along which the shock absorber is length-adjustable during a compression within a predefined or predefinable stroke. In particular, the shock absorber can be formed linearly length-adjustable. The shock absorber can have a longitudinal extent which extends substantially from a first end to a second end of the shock absorber. To fasten the shock absorber in or on a bicycle frame, the shock absorber can have a first lug with a through-hole at the first end and a second lug with a through-hole at the second end. Common terms for shock absorbers known in the state of the art include suspension strut, air damper, damper, bicycle damper, rear triangle damper or spring element.

Different designs are possible for a bicycle frame. In principle, a bicycle frame can have a main frame and a rear triangle with at least one stay pivotable about a pivot axis relative to the main frame. A saddle, a bottom bracket along with cranks and a bicycle fork for mounting the front wheel are usually mounted on or in the main frame. An axle of a rear wheel can be clamped in the rear triangle of the bicycle frame and can be movable, guided within a spring travel, along a spring movement relative to a main frame of the bicycle frame. A cushioning and damping of the movement is usually carried out by a length-adjustable shock absorber. An axle of a wheel, in particular a rear wheel, of the bicycle, is usually mounted on or via the stay of the bicycle frame. A suspension system of a bicycle frame can comprise at least one spring-mounted rear wheel and at least one spring-mounted front wheel.

Designs with different geometries and kinematics are known in particular for the rear triangle, wherein the rear triangle usually has at least one pivotable stay for the application of force to the shock absorber.

The at least one pivotable stay can be formed as a chain stay, as a seat stay or as a rocker link.

During a movement of the at least one pivotable stay relative to the main frame, the application of force can bring about a compression of the shock absorber, wherein the latter can be arranged between stays of the rear triangle or between the rear triangle and the main frame.

In a simple embodiment, the rear triangle is designed as a so-called single-pivot system in which the rear axle of the bicycle is connected to the main frame with a central hinge bearing. The at least one pivotable stay can pivot about the central hinge bearing relative to the main frame, wherein a compression of the shock absorber arranged between the rear triangle and the main frame can occur.

In a further embodiment, the rear triangle can be designed as a so-called multi-pivot, in particular four-pivot, system in which the rear axle is connected to the main frame with at least two hinge bearings, similar to a parallelogram mechanism. The at least one pivotable stay can pivot about a hinge bearing relative to the main frame, wherein a compression of the shock absorber arranged between stays of the rear triangle or between the rear triangle and the main frame can occur.

In a further embodiment, the rear triangle can be mounted on the main frame pivotable about a virtual pivot point. A rear triangle mounted pivotable about a virtual pivot point can be achieved by a combination of hinge bearings and/or linear guides. The rear triangle can have at least one pivotable stay, for example in the form of at least one rocker link, for compressing the shock absorber during a movement of the at least one pivotable stay relative to the main frame.

In principle, the link bracket can be arranged between the rear triangle and the shock absorber.

The link bracket has at least one first hinge connection for a pivotable connection of the link bracket to the first end of the shock absorber. Through the first hinge connection, a pivoting movement about a first pivot axis can take place between the link bracket and the shock absorber. The pivotability about the first pivot axis can be limited to a rotatory degree of freedom.

The link bracket has at least one second hinge connection for a pivotable connection to a bicycle frame of a bicycle. Through the at least one second hinge connection, a pivoting movement about a second pivot axis can take place between the link bracket and a bicycle frame, for example a stay of a rear triangle or a main frame. The pivotability about the second pivot axis can be limited to a rotatory degree of freedom.

In the installed state of the link bracket on the shock absorber, the link bracket is connected to the first end of the shock absorber via the first hinge connection. For the link bracket it is provided that the at least one second hinge connection and the second pivot axis are arranged between the first end and the second end of the shock absorber relative to the longitudinal axis of the shock absorber, wherein the first pivot axis and the second pivot axis are spaced apart from each other by a positive normal distance and run transversely to each other.

For the purpose of the invention, the term "transversely" can be understood to mean that, seen in projection onto a longitudinal extent of the shock absorber, the first pivot axis and the second pivot axis run at an angle of from 30 degrees to 90 degrees relative to each other.

In particular, seen in projection onto a longitudinal extent of the shock absorber, the first pivot axis and the second pivot axis can run perpendicular to each other.

The at least one second hinge connection—and thus the second pivot axis—can be arranged inside the longitudinal extent of the shock absorber, in particular for all longitudinal extents of the shock absorber within a predefined or pre-definable stroke. The second pivot axis of the second hinge connection and the longitudinal axis of the shock absorber can lie together in one plane.

The arrangement of the at least one second hinge connection—and thus of the second pivot axis—can be chosen substantially freely within the longitudinal extent of the shock absorber through appropriate dimensioning of the link bracket. The arrangement of the at least one second hinge connection can be carried out substantially independently of the longitudinal extent of the shock absorber. The geometry and kinematics of a sprung bicycle frame with such a link bracket is thus essentially not determined by the dimensions, in particular the longitudinal extent, of the shock absorber. Conversely, a broader suitability of a shock absorber with a specific longitudinal extent for different geometries and kinematics of a sprung bicycle frame can result.

As a result of the spacing of the pivot axes by a positive normal distance, forces acting on the shock absorber, in particular transverse forces directed laterally to a linear movability of the shock absorber, can be reduced.

In particular, possibly with appropriate dimensioning of the link bracket, the distance of the at least one second hinge connection, which exists between the link bracket and a bicycle frame, and the second end of the shock absorber can be chosen substantially freely. The distance of the at least one second hinge connection and the second end of the shock absorber can be chosen substantially independently of the stroke of the shock absorber, which usually correlates with the longitudinal extent.

Because the first pivot axis of the hinge connection between the link bracket and the shock absorber and the second pivot axis of the hinge connection between the link bracket and a bicycle frame run transversely to each other, seen in projection onto a longitudinal extent of the shock absorber, the pivot axes do not run parallel to each other. As a result of the spacing of the pivot axes by a positive normal distance, they have no common intersection.

Because the first pivot axis and the second pivot axis run transversely to each other, seen in projection onto a longitudinal extent of the shock absorber, the linking of the shock absorber can have substantially two rotatory degrees of freedom. During a compression of the shock absorber arranged in or on a bicycle frame, transverse forces acting laterally to a linear movability of the shock absorber can be reduced. Effects of manufacturing tolerances of the bicycle frame on the shock absorber can thus be reduced.

Because the first pivot axis and the second pivot axis run transversely to each other, seen in projection onto a longitudinal extent of the shock absorber, an introduction of transverse forces acting on a rear triangle of a bicycle frame can be at least partly avoided as a result of a relative movement of the link bracket and the shock absorber.

Through the combination of the spacing of the pivot axes by a positive normal distance and the fact that the first pivot axis and the second pivot axis run transversely to each other, it is possible through the bicycle assembly to synergistically minimize transverse forces acting on the shock absorber and optimize the suitability of a shock absorber for different geometries and kinematics of a sprung bicycle frame.

Because the first pivot axis and the second pivot axis run transversely to each other, the link bracket does not need any additional guide means, such as for example linear guides or additional levers arranged on the bicycle frame.

In general, the hinge connections can be formed as plain bearings, roller bearings or as a flexure bearing with a rotatory degree of freedom.

The link bracket can have a middle section and two arms, wherein the two arms can be formed protruding from the middle section of the link bracket.

The at least one first hinge connection can be formed in or on the middle section. For in each case a pivotable connection to a bicycle frame of a bicycle, in particular to a rear triangle, the second hinge connection can be formed in or on the first arm. A third hinge connection can be formed in or on the second arm, wherein the second hinge connection and the third hinge connection can lie together on the second pivot axis B.

The two arms can be arranged stationary on the middle section, wherein the link bracket can be manufactured in one piece in a preferred embodiment.

The link bracket can have a substantially T-shaped and/or U-shaped cross section, at least in sections. In particular, the middle section and/or the arms can have a T-shaped and/or U-shaped cross section, at least in sections.

The positive normal distance between the first pivot axis and the second pivot axis lies in a range of from 10 millimeters to 75 millimeters. The normal distance between the first pivot axis and the second pivot axis can preferably lie in a range of from 25 millimeters to 50 millimeters. The normal distance can particularly preferably be 25 millimeters.

The link bracket can be formed curved, wherein a side of the link bracket facing the shock absorber can have a concave curvature. A spacing of the pivot axes can be produced in a structurally simple manner by the concave curvature.

In the installed state of the link bracket on the shock absorber, the shock absorber can be able to be arranged at least partly between the at least one first hinge connection and the at least one second hinge connection. The link bracket can partly surround the shock absorber in the area of the first end.

In a preferred embodiment, the link bracket can have a middle section and two arms protruding from the middle section, wherein, in the installed state of the link bracket on the shock absorber, the shock absorber can be able to be arranged at least partly between the two arms. In addition to a compact construction, this also results in a favorable moment loading of the shock absorber, in which the second pivot axis of the second hinge connection and the longitudinal axis of the shock absorber can lie together in one plane.

The link bracket can have a tubular cross section at least in the area of the second hinge connection and, in the installed state of the link bracket on the shock absorber, the shock absorber can be at least partly surrounded by the link bracket. The link bracket can partly enclose the shock absorber.

Protection is also sought for a bicycle frame with a bicycle assembly as described above.

As described above, the bicycle frame comprises a main frame and a rear triangle with at least one stay, which is pivotable about a pivot axis relative to the main frame, and with which the link bracket can be connectable to the least one second hinge connection. The at least one pivotable stay can be formed as a chain stay, as a seat stay or as a rocker link. The link bracket is advantageously pivotably connected to the first end of the shock absorber with the at least one first hinge connection and pivotably connected to the main frame or the rear triangle with the at least one second hinge connection.

The second pivot axis running through the at least one second hinge connection is advantageously arranged parallel to the pivot axis of the at least one pivotable stay of the rear triangle.

With the first end, the shock absorber can be connected to the at least one first hinge connection of the link bracket pivotable about the first pivot axis. With the second end, the shock absorber can be connected to the main frame or the rear triangle pivotable about a pivot axis. At the second end of the shock absorber, the pivot axis of the hinge connection advantageously runs parallel to the pivot axis of the at least one pivotable stay of the rear triangle. The first pivot axis of the hinge connection between the link bracket and the first end of the shock absorber can run transversely to the two above-named pivot axes.

The shock absorber can have a first lug with a through-hole at the first end and a second lug with a through-hole at the second end, wherein bearing points for hinge connections can be formed in each case in the through-holes. In the installed state of the link bracket on the shock absorber and of the shock absorber on the bicycle frame of a bicycle, the through-holes of the lugs can run transversely to each other, which can result in the pivot axes of the link bracket running transversely to each other. If the pivot axes of the link bracket run perpendicularly, the through-holes of the lugs can run perpendicularly.

BRIEF DESCRIPTION OF THE DRAWINGS

Embodiments of the invention are discussed with reference to the figures, in which.

DETAILED DESCRIPTION OF THE INVENTION

Figure 1B:
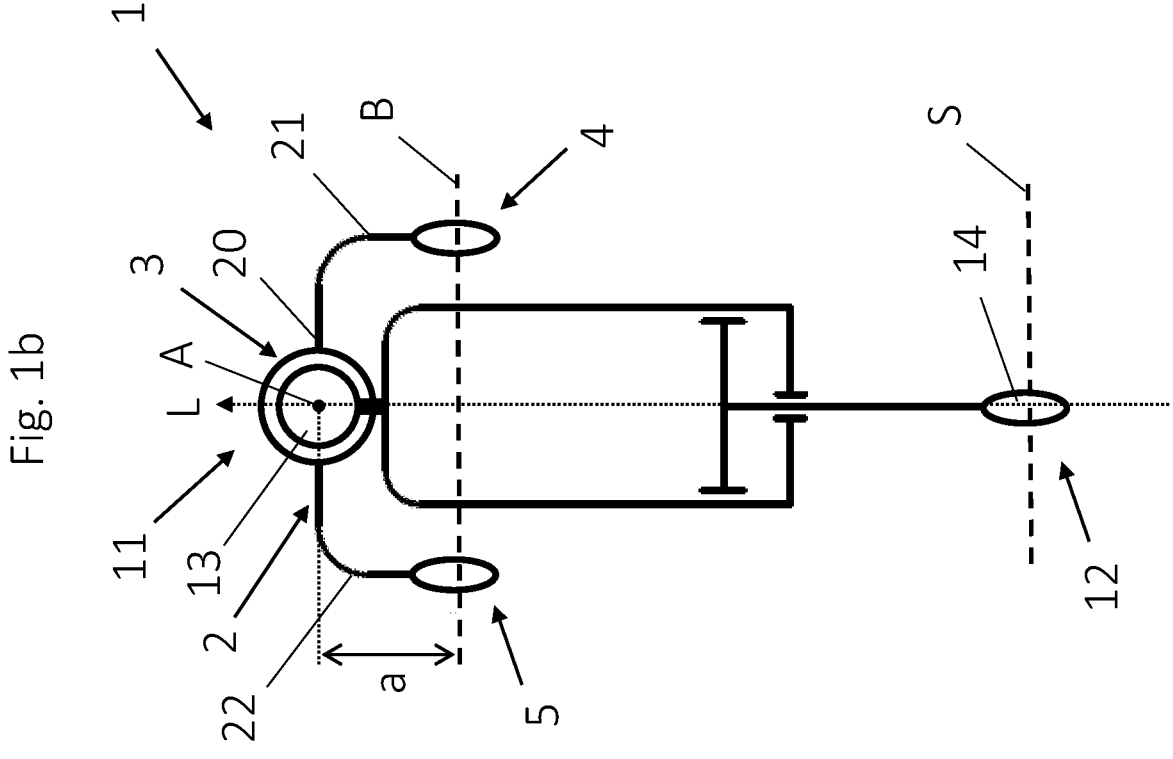
FIGS. 1a to 1d are schematic representations of different embodiments of shock absorbers.
Figure 1A:
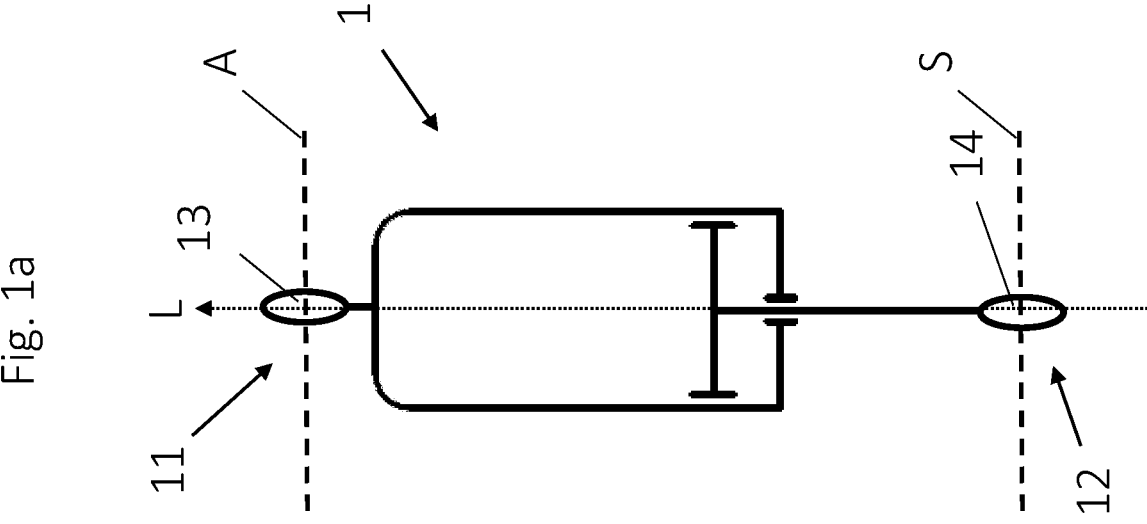

A shock absorber 1 according to an embodiment known in the state of the art is shown schematically in FIG. 1a. A bicycle assembly according to a first embodiment of the invention with a shock absorber 1 and a link bracket 2 is shown schematically in FIG. 1b. A top view along a longitudinal extent L and a side view of a bicycle assembly according to a second embodiment of the invention with a shock absorber 1 and a link bracket 2 are shown schematically in FIGS. 1c and 1d.

Figure 2:
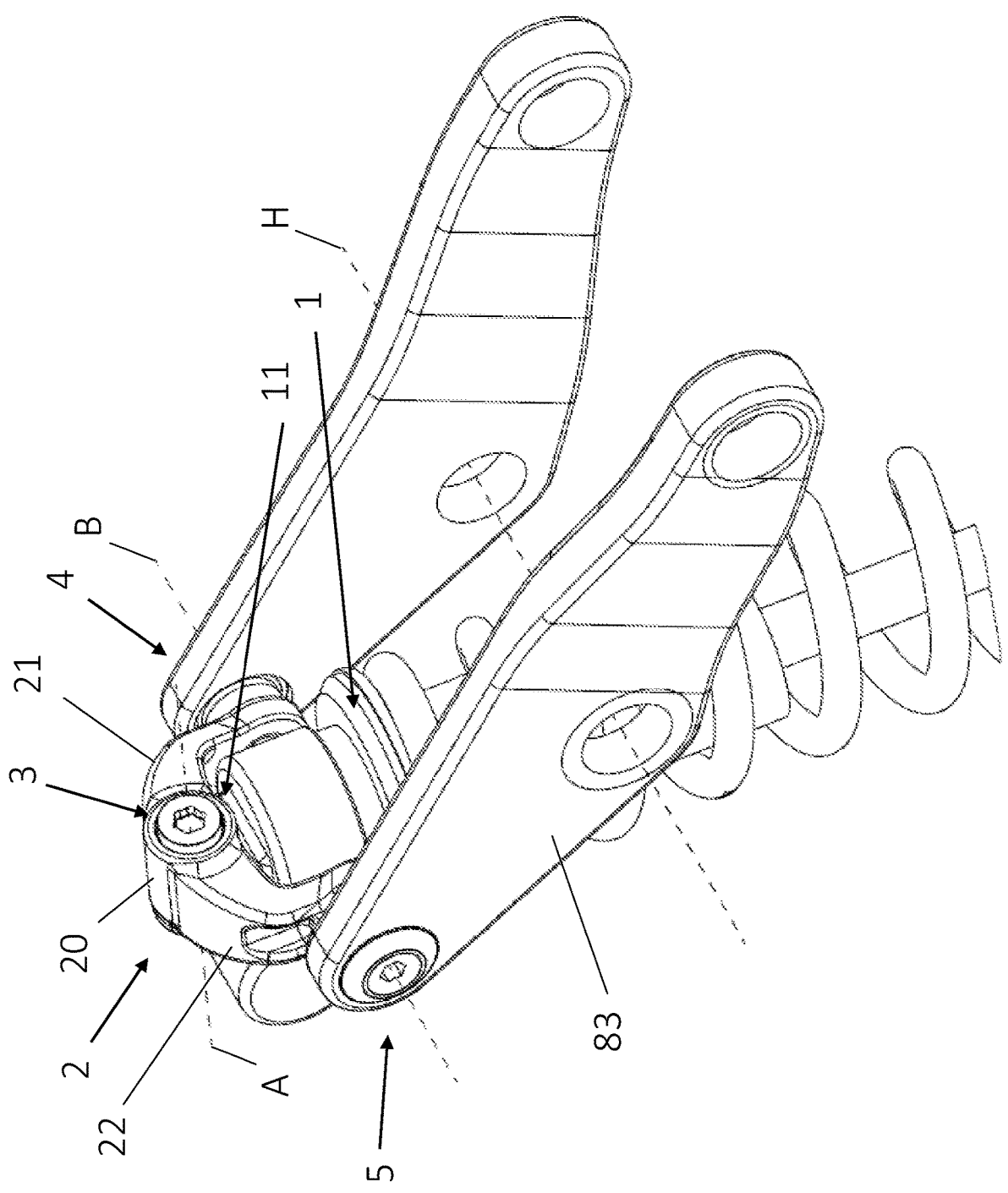
FIG. 2 is a perspective view of an embodiment of a bicycle assembly with a stay of a rear triangle.
Figure 3A:
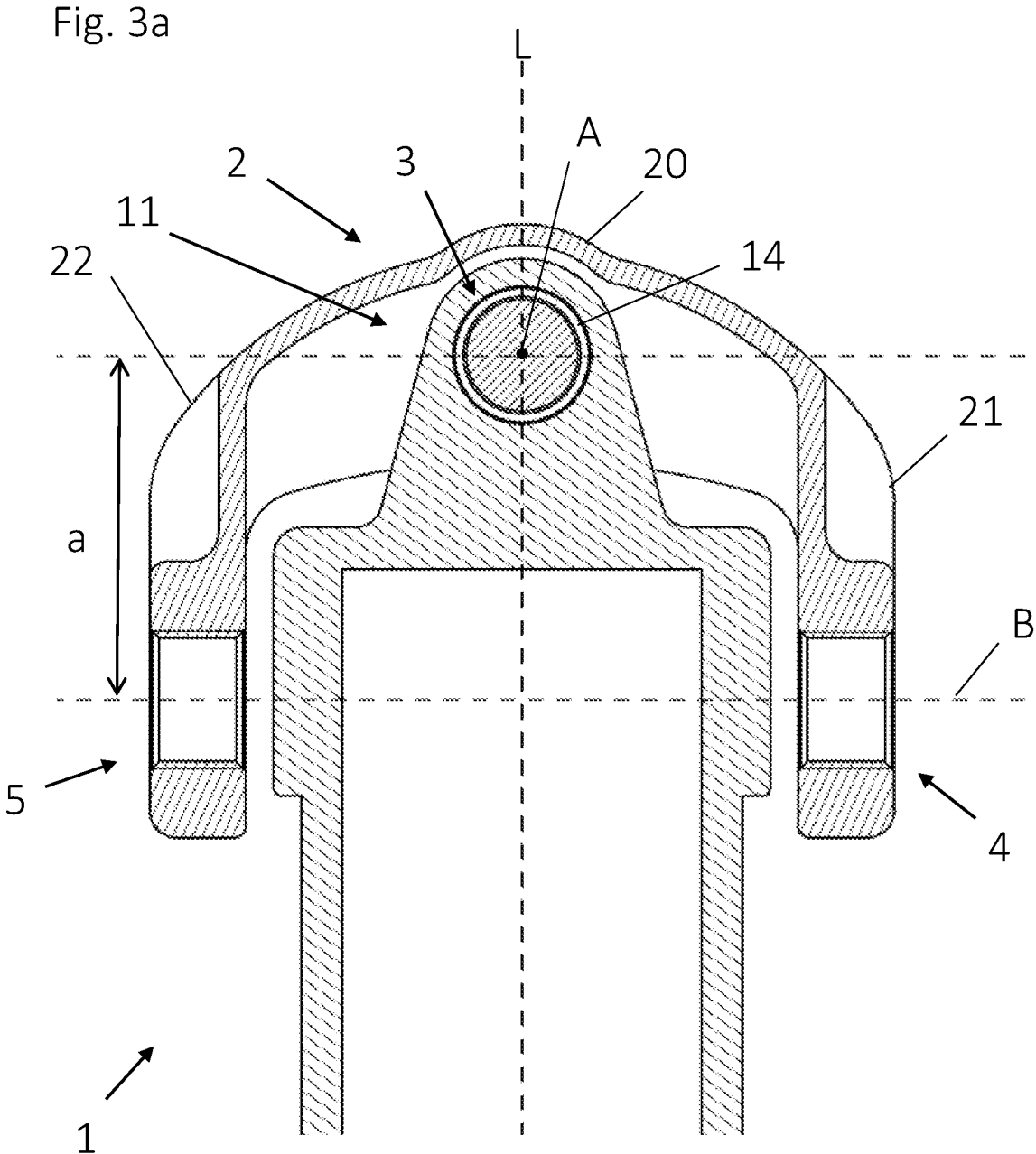
FIGS. 3a and 3b are sectional representations through the embodiment of a bicycle assembly according to FIG. 2.
Figure 3B:
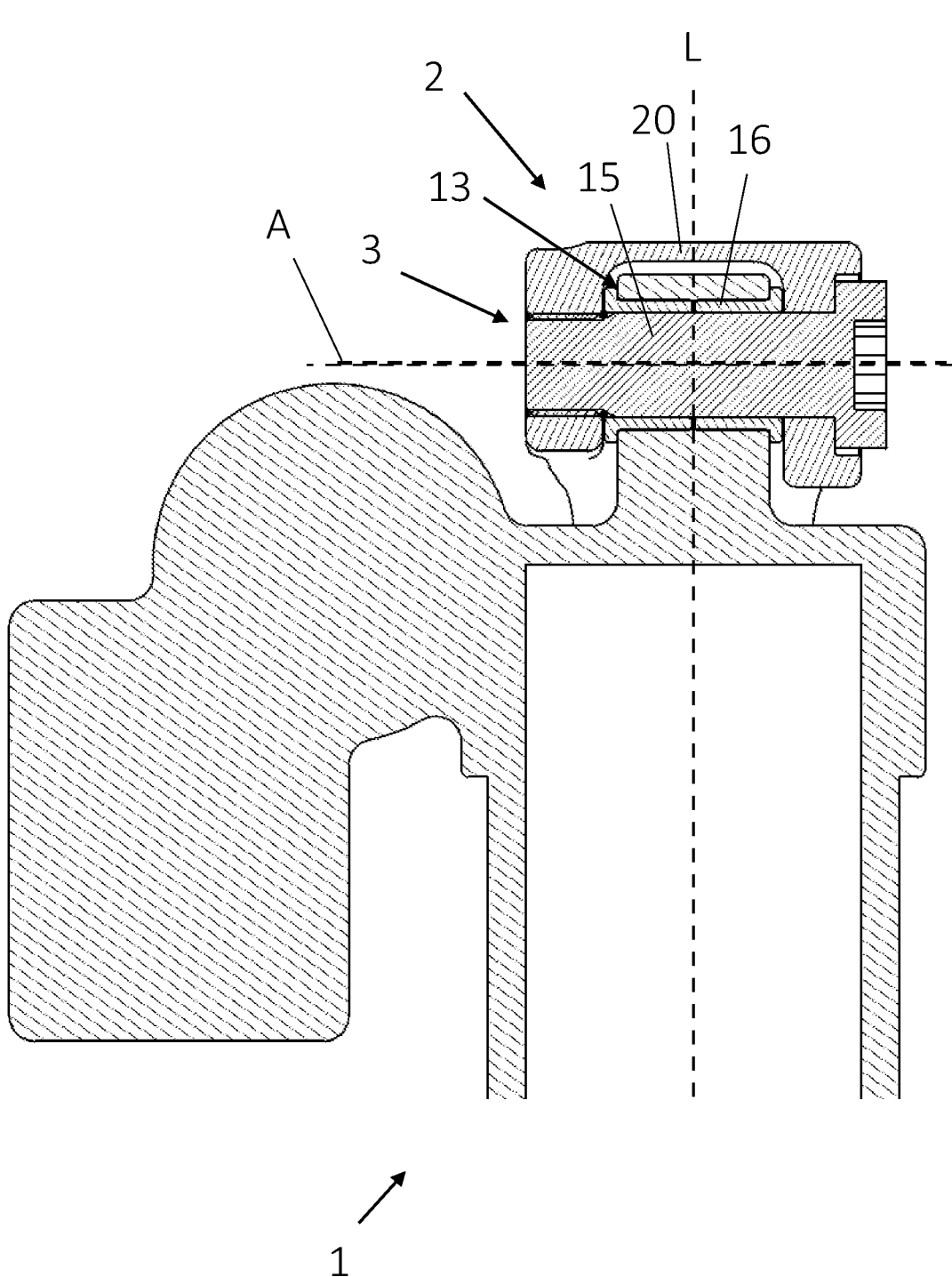

FIG. 2 shows a perspective view of a bicycle assembly according to a first embodiment of the invention with a shock absorber 1 and a link bracket 2, which is connected to a stay in the form of a rocker link 83. Sectional representations of the embodiment shown in FIG. 2 of a bicycle assembly with a shock absorber 1 and a link bracket 2 are shown in FIGS. 3a and 3b, wherein the sectional plane runs along the longitudinal axis L and the pivot axis B in FIG. 3a and along the longitudinal axis L and the pivot axis A in FIG. 3b.

Figure 4A:
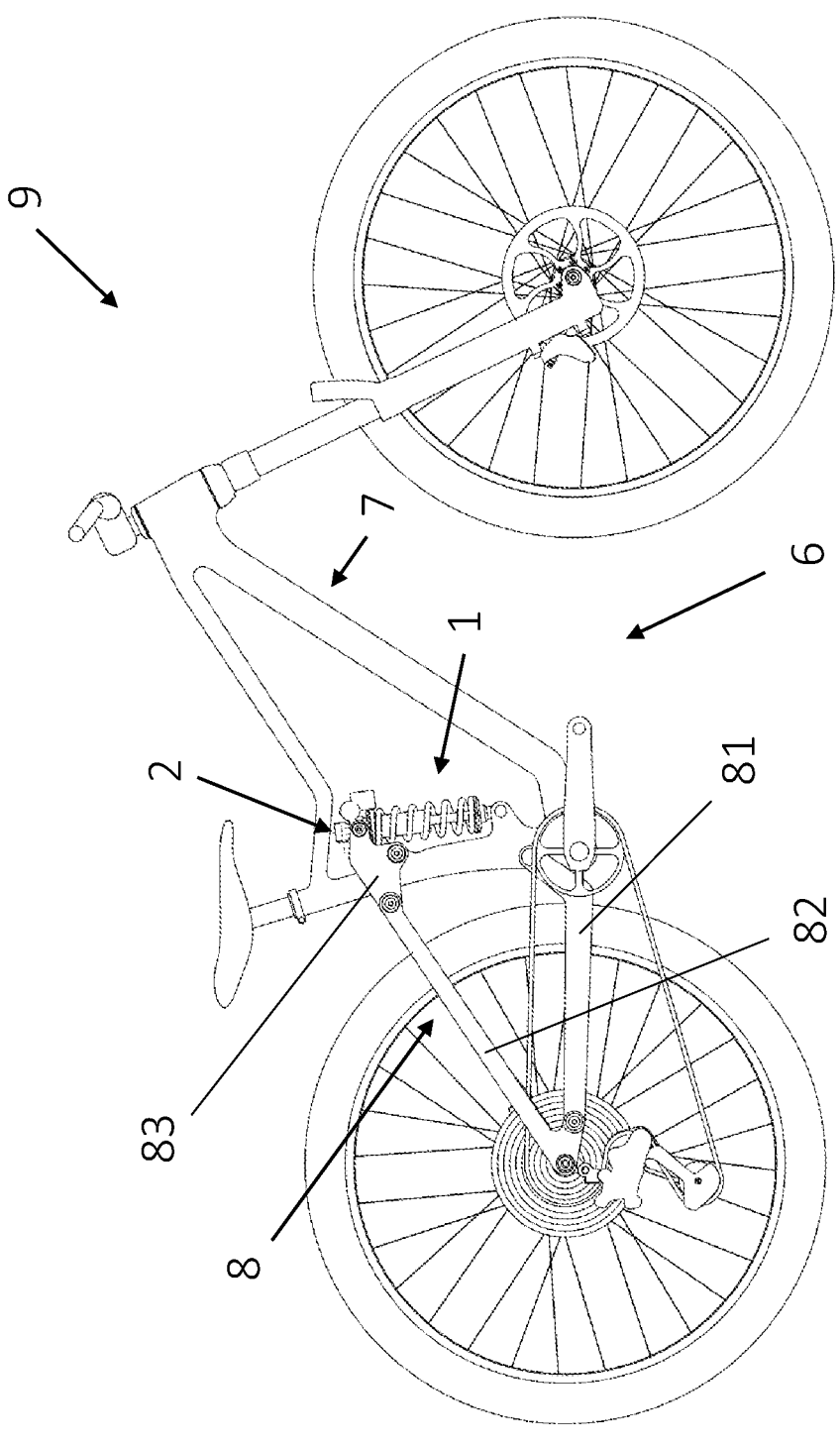
FIGS. 4a and 4b is a side view and a detail view of an embodiment of a bicycle with an embodiment of a bicycle assembly.
Figure 4B:
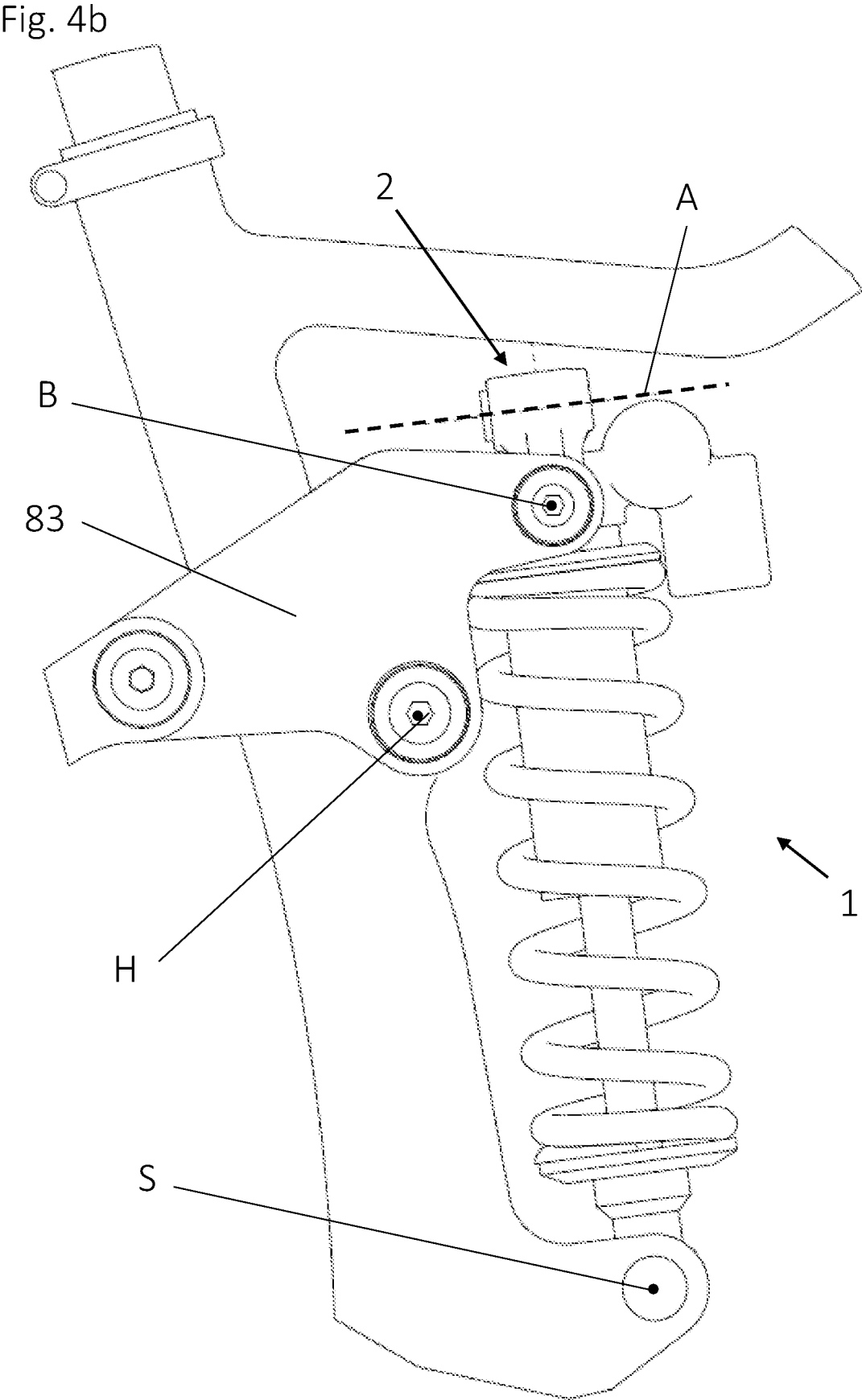
Figure 5:
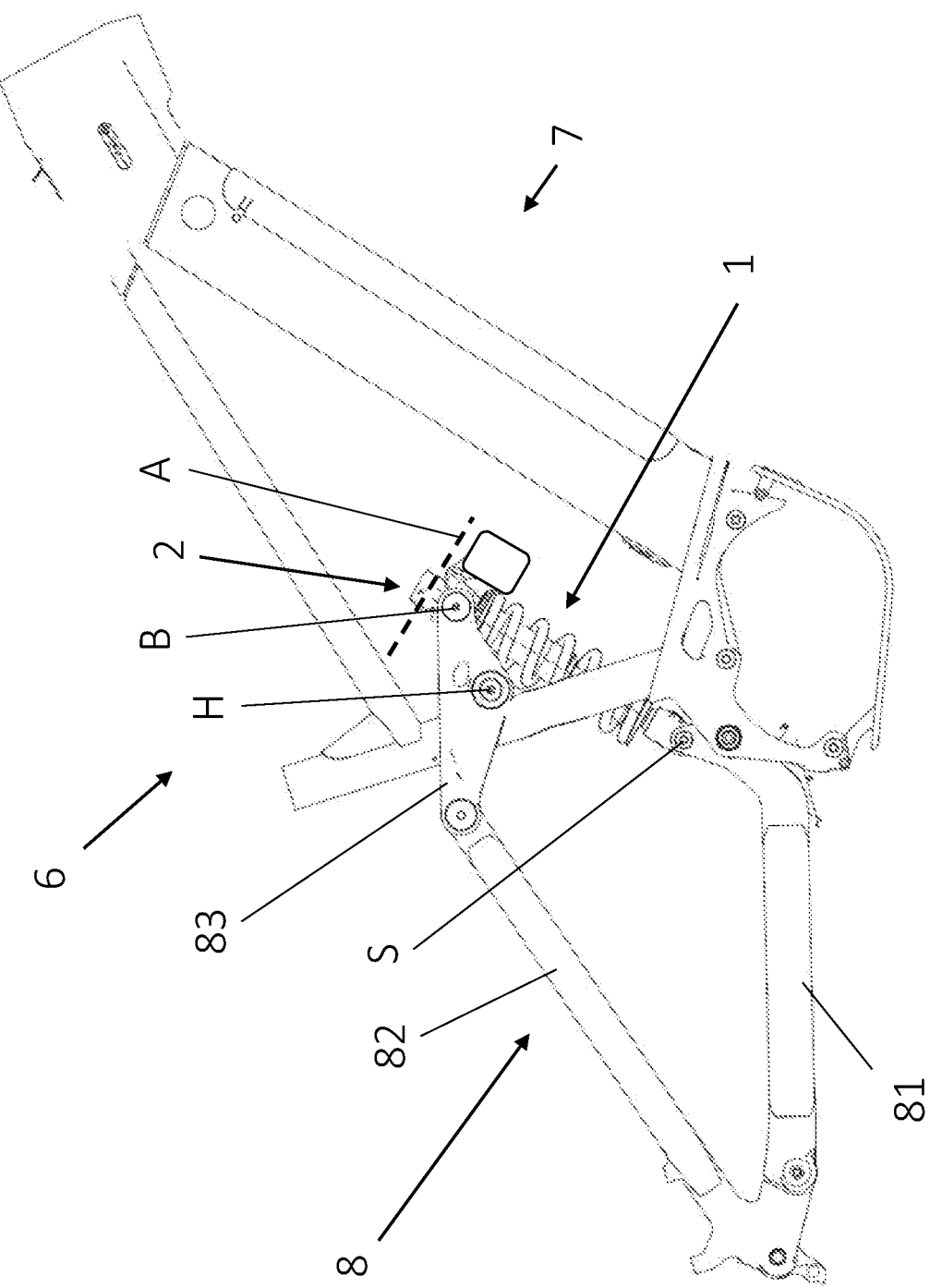
FIG. 5 is a representation of a bicycle frame with an embodiment of a bicycle assembly

FIGS. 4a and 4b show a side view and a detail view of an embodiment of a bicycle 9 with a bicycle frame 6 and a bicycle assembly according to a first embodiment of the invention with a shock absorber 1 and a link bracket 2. FIG. 5 shows a side view of a further embodiment of a bicycle frame with a bicycle assembly according to a first embodiment of the invention with a shock absorber 1 and a link bracket 2.

Figures 1C, 1D:
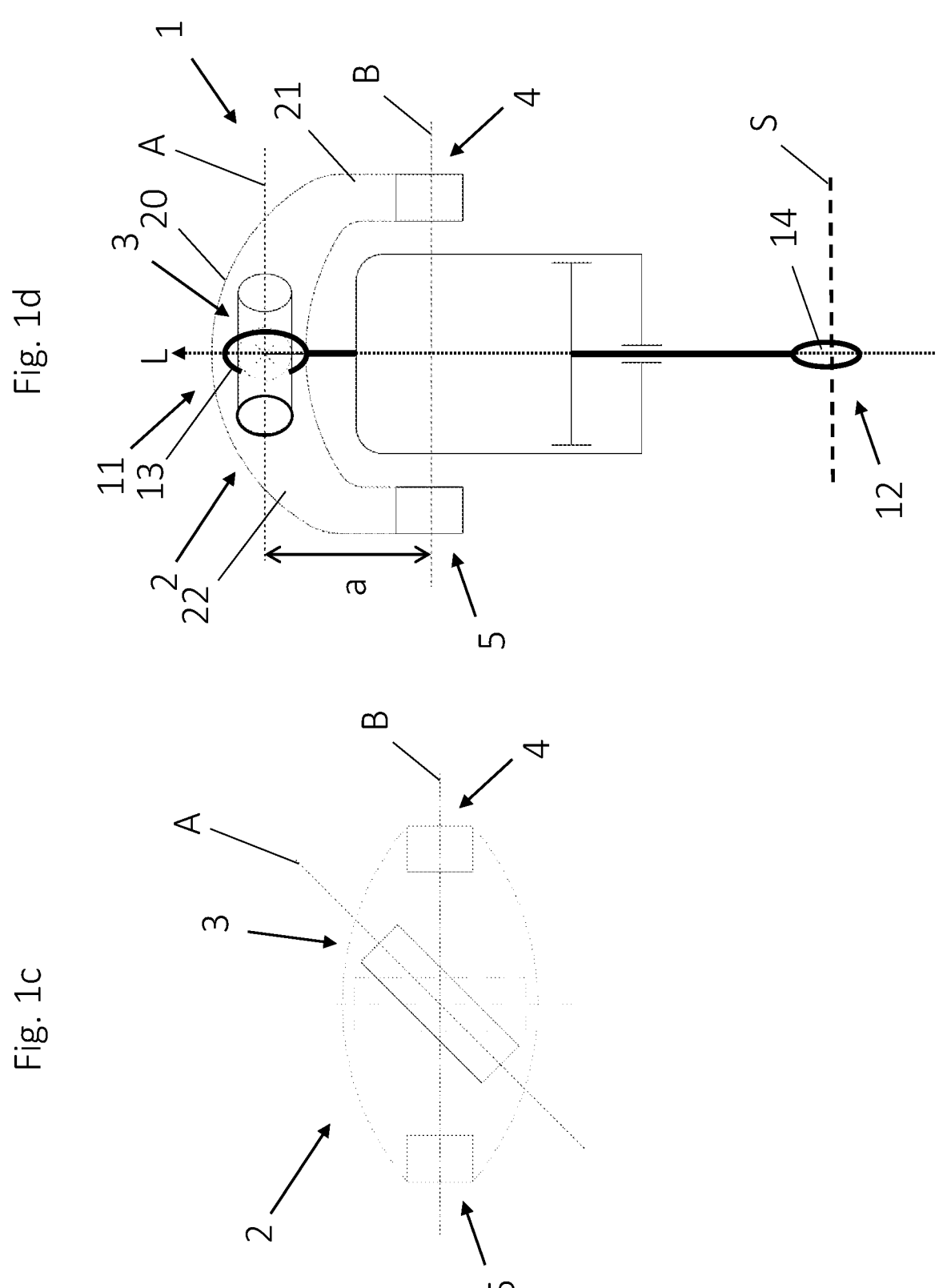

For the bicycle assemblies and bicycles or bicycle frames shown in FIGS. 2 to 5, the use of a bicycle assembly according to a second embodiment as represented in FIGS. 1c and 1d is possible.

A shock absorber 1 according to an embodiment known in the state of the art is shown schematically in FIG. 1a. To fasten the shock absorber 1 in or on a bicycle frame along a longitudinal axis L, the shock absorber 1 has a first lug 13 with a through-hole at the first end 11 and a second lug 14 with a through-hole at the second end 12. The pivot axes A, S running through the through-holes of the lugs 13, 14 run parallel to each other. The fastening of the shock absorber 1 in or on a bicycle frame at the first end 11 of the shock absorber 1 has merely a rotatary degree of freedom.

A first embodiment of a bicycle assembly with a shock absorber 1 and a link bracket 2 is shown schematically in FIG. 1b. An analogous view of a sectional representation through a bicycle assembly is shown in FIG. 3a. Along a longitudinal axis L, the shock absorber 1 has a first lug 13 with a through-hole at the first end 11 and a second lug 14 with a through-hole at the second end 12. With the first end 11, the shock absorber 1 is pivotably connected to the link bracket 2 with at least one first hinge connection 3. A first pivot axis A, which is represented in top view in FIG. 1b, runs through the at least one first hinge connection 3. For a pivotable connection to a bicycle frame 6 of a bicycle 9 (see for example FIG. 4b), in the represented embodiment the link bracket 2 has a second hinge connection 4 and a third hinge connection 5 arranged opposite it. A second pivot axis B runs through the second hinge connection 4 and the third hinge connection 5.

In the represented installed state of the link bracket 2 on the shock absorber 1 (see also FIGS. 2, 3*a* and 3*b* for this), the at least one second hinge connection 3 and the third hinge connection 4, and thus the second pivot axis B, are arranged between the first end 11 and the second end 12 of the shock absorber 1 relative to the longitudinal axis L of the shock absorber 1. In addition, the first pivot axis A and the second pivot axis B are spaced apart from each other by a positive normal distance a and run transversely to each other, wherein the first pivot axis A and the second pivot axis B run perpendicular to each other, seen in projection onto the longitudinal extent L.

The fastening of the shock absorber 1 at the first end 11 in or on a bicycle frame 6 thus has two rotatory degrees of freedom in the form of the first pivot axis A and the second pivot axis B.

A top view along a longitudinal extent L and a side view of a bicycle assembly according to a second embodiment of the invention with a shock absorber 1 and a link bracket 2 are shown schematically in FIGS. 1*c* and 1*d*. In contrast to the embodiment shown in FIG. 1*b*, in the embodiment of FIGS. 1*c* and 1*d* the link bracket 2 has a first pivot axis A and a second pivot axis B which are spaced apart from each other by a positive normal distance a and run obliquely relative to each other, wherein the first pivot axis A and the second pivot axis B, seen in projection onto the longitudinal extent L, enclose an angle which is smaller than 90 degrees. In the represented embodiment, the first pivot axis A and the second pivot axis B, seen in projection onto the longitudinal extent L, enclose an angle of approximately 45 degrees. In general, an angle deviating from this in a range of from 30 degrees to 90 degrees is conceivable.

FIG. 2 shows a perspective view of an embodiment of a bicycle assembly with a shock absorber 1 and a link bracket 2, which is connected to a stay in the form of a rocker link 83 of a rear triangle 8, not represented in more detail here, of a bicycle frame 6. Sectional representations of the embodiment shown in FIG. 2 of a bicycle assembly with a shock absorber 1 and a link bracket 2 are shown in FIGS. 3*a* and 3*b*.

As can be inferred from the representations of FIGS. 2, 3*a* and 3*b*, the link bracket 2 has a middle section 20 and two arms 21, 22, wherein the two arms 21, 22 are formed protruding from the middle section 20 of the link bracket 2. The at least one first hinge connection 3 is formed on the middle section 20. The second hinge connection 4 is formed on the first arm 21 and the third hinge connection 5 is formed on the second arm 22, for in each case a pivotable connection to a bicycle frame 6 of a bicycle 9, wherein the second pivot axis B runs through the second hinge connection 4 and the third hinge connection 5.

As represented in FIG. 3*b*, the first hinge connection 3 can comprise a bearing pin 16, which is mounted in the link bracket 2, and which is mounted in bearing bushings 16 in the through-hole of the lug 13 at the first end 11 of the shock absorber 1. Analogous designs of the second and third hinge connection 4, 5 as well as of the pivotable mounting of the shock absorber 1 at the second end 12 are likewise conceivable.

The two arms 21, 22 are arranged stationary on the middle section 20, as can be seen in FIGS. 2, 3*a* and 3*b*, wherein the link bracket 2 can advantageously be manufactured in one piece. It can be seen in particular in FIGS. 2 and 3*a* that in an advantageous embodiment the two arms 21, 22 can have a substantially T-shaped cross section, at least in sections, and the middle section 20 can have a substantially U-shaped cross section, at least in sections.

A side of the link bracket 2 facing the shock absorber 1 can have a concave curvature and thus substantially follow a contour of the first end 11 of the shock absorber 1.

In the represented installed state of the link bracket 2 on the shock absorber 1, the shock absorber 1 is arranged at least partly between the at least one first hinge connection 3 and the at least one second hinge connection 4. In particular, in the installed state of the link bracket 2 on the shock absorber 1, the shock absorber 1 is arranged at least partly between the two arms 21, 22.

With respect to the position of the pivot axes, it can be inferred in particular from FIGS. 2, 4*b* and 5 that the second pivot axis B running through the at least one second hinge connection 4 runs parallel to the pivot axis H of the at least one pivotable stay in the form of the rocker link 83 of the rear triangle 8. It can further be inferred from the figures that, with the second end 12, the shock absorber 1 is connected to the main frame 7 (FIG. 4*b*) or the rear triangle 8 (FIG. 6) pivotable about a pivot axis S, wherein the pivot axis S runs parallel to the pivot axis H of the at least one pivotable stay in the form of the rocker link 83 of the rear triangle 8.

It can further be inferred from FIGS. 2, 4*b* and 5 that, in the installed state of the link bracket 2 on the shock absorber 1 and of the shock absorber on the bicycle frame 6 of a bicycle 9, the through-holes of the lugs 13, 14 (cf. FIG. 1*b*) run perpendicular to each other.

LIST OF REFERENCE NUMBERS

1 shock absorber
11 first end
12 second end
13 lug
14 lug
15 bearing pin
16 bearing bushing
2 link bracket
20 middle section
21 arm
22 arm
3 first hinge connection
4 second hinge connection
5 third hinge connection
6 bicycle frame
7 main frame
8 rear triangle
81 chain stay
82 seat stay
83 rocker link
9 bicycle
a normal distance
L shock absorber longitudinal axis
A first pivot axis
B second pivot axis
H pivot axis
S pivot axis

The invention claimed is:
1. A bicycle assembly comprising:
a shock absorber with a longitudinal axis and a first end and a second end, and
a link bracket with at least one first hinge connection for a pivotable connection to the first end of the shock absorber and at least one second hinge connection for a pivotable connection to a bicycle frame of a bicycle, wherein a first pivot axis runs through the at least one first hinge connection and a second pivot axis runs through the at least one second hinge connection, wherein, in the installed state of the link bracket on the shock absorber, the at least one second hinge connection and the second pivot axis are arranged between the first end and the second end of the shock absorber relative to the longitudinal axis of the shock absorber, wherein the first pivot axis and the second pivot axis are spaced apart from each other by a positive normal distance and run transversely to each other.

2. The bicycle assembly according to claim 1, wherein the link bracket has a middle section and two arms, wherein the two arms are formed protruding from the middle section of the link bracket.

3. The bicycle assembly according to claim 1, wherein the at least one first hinge connection is formed on the middle section and the second hinge connection is formed on the first arm and the third hinge connection is formed on the second arm, for in each case a pivotable connection to a bicycle frame of a bicycle, wherein the second pivot axis runs through the second hinge connection and the third hinge connection.

4. The bicycle assembly according to claim 2, wherein the two arms are arranged stationary on the middle section, wherein the link bracket is preferably manufactured in one piece.

5. The bicycle assembly according to claim 1, wherein the link bracket has a substantially T-shaped and/or U-shaped cross section at least in sections.

6. The bicycle assembly according to claim 1, wherein the link bracket has two arms protruding from a middle section of the link bracket, wherein the two arms and/or the middle section have a substantially T-shaped and/or U-shaped cross section at least in sections.

7. The bicycle assembly according to claim 1, wherein normal distance between the first pivot axis and the second pivot axis lies in a range of from 10 millimeters to 75 millimeters.

8. The bicycle assembly according to claim 1, wherein a side of the link bracket facing the shock absorber has a concave curvature.

9. The bicycle assembly according to claim 1, wherein, in the installed state of the link bracket on the shock absorber, the shock absorber can be arranged at least partly between the at least one first hinge connection and the at least one second hinge connection.

10. The bicycle assembly according to claim 1, wherein the link bracket has a tubular cross section at least in the area of the second hinge connection and, in the installed state of the link bracket on the shock absorber, the shock absorber is at least partly surrounded by the link bracket.

11. The bicycle assembly according to claim 1, wherein the link bracket has a middle section and two arms, wherein the two arms are formed protruding from the middle section of the link bracket, wherein, in the installed state of the link bracket on the shock absorber, the shock absorber can be arranged at least partly between the two arms.

12. A bicycle frame with the bicycle assembly according to claim 1, comprising:

a main frame a rear triangle with at least one stay pivotable about a pivot axis relative to the main frame wherein the link bracket is pivotably connected with the at least one first hinge connection to the first end of the shock absorber and is pivotably connected with the at least one second hinge connection to the main frame or the rear triangle.

13. The bicycle frame according to claim 12, wherein the second pivot axis running through the at least one second hinge connection runs parallel to the pivot axis of the at least one pivotable stay of the rear triangle.

14. The bicycle frame according to claim 12, wherein, with the first end, the shock absorber is connected to the at least one first hinge connection of the link bracket pivotable about the first pivot axis and, with the second end, is connected to the main frame or the rear triangle pivotable about a pivot axis, wherein the pivot axis runs parallel to the pivot axis of the at least one pivotable stay of the rear triangle.

15. The bicycle frame according to claim 12, wherein the shock absorber has a first lug with a through-hole at the first end and has a second lug with a through-hole at the second end, wherein, in the installed state of the link bracket on the shock absorber and of the shock absorber on the bicycle frame of a bicycle, the through-holes of the lugs run transversely to each other.

* * * * *